United States Patent [19]

Graell

[11] Patent Number: 5,187,341
[45] Date of Patent: Feb. 16, 1993

[54] METHOD OF REDUCING THE WEAR OF THE ELECTRODE IN MACHINE TOOLS USING ELECTRO-EROSION

[76] Inventor: Alberto C. Graell, Capitán Arenas, 21-33, 08034 Barcelona, Spain

[21] Appl. No.: 435,016

[22] Filed: Nov. 9, 1989

[30] Foreign Application Priority Data

Nov. 11, 1988 [ES]  Spain .................................. 8803419

[51] Int. Cl.⁵ .......................... B23H 7/14; B23H 7/18
[52] U.S. Cl. .............................. 219/69.13; 219/69.18
[58] Field of Search .............. 219/69.13, 69.16, 69.18; 204/224 M

[56] References Cited

U.S. PATENT DOCUMENTS

| | | | |
|---|---|---|---|
| 3,809,848 | 5/1974 | Bell, Jr. ............................ | 219/69.18 |
| 3,812,317 | 5/1974 | De Bont et al. .................. | 219/69.18 |
| 3,825,715 | 7/1974 | Saito et al. ....................... | 219/69.18 |
| 3,892,936 | 7/1975 | Kobayashi et al. .............. | 219/69.18 |
| 3,916,138 | 10/1975 | Pfau .................................. | 219/69.13 |
| 3,974,357 | 8/1976 | Saito et al. ....................... | 219/69.13 |
| 4,292,490 | 9/1981 | Bell, Jr. et al. .................. | 219/69.18 |
| 4,310,741 | 1/1982 | Inoue ................................ | 219/69.18 |
| 4,667,079 | 5/1987 | Matsumura et al. ............. | 219/69.16 |
| 4,700,039 | 10/1987 | Konno et al. .................... | 219/69.16 |
| 4,800,248 | 1/1989 | Futamura ......................... | 219/69.19 |
| 4,806,719 | 2/1989 | Seereider et al. ................ | 219/69.13 |

FOREIGN PATENT DOCUMENTS

| | | | |
|---|---|---|---|
| 102628 | 6/1983 | Japan ............................... | 219/69.13 |
| 61-25722 | 2/1986 | Japan ............................... | 219/69.13 |
| 63-156618 | 6/1988 | Japan ............................... | 219/69.18 |
| 169220 | 7/1988 | Japan ............................... | 219/69.13 |
| 200918 | 8/1988 | Japan ............................... | 219/69.13 |
| 2016346 | 9/1979 | United Kingdom ............. | 219/69.13 |

Primary Examiner—Geoffrey S. Evans
Attorney, Agent, or Firm—Flynn, Thiel, Boutell & Tanis

[57] ABSTRACT

Method of reducing the wear of the electrode in machine tools using electro-erosion. There is provided a circuit with different stages of power; the tension of the first can be superior, facilitating the ionization of the channel and reducing the delay of ionization. A circuit detects the ionization and sets going some programmable counters which count impulses proceeding from the time base, the frequency of which is superior to that of the work impulses; when the preselected count has been reached, the circuit emits a signal of conduction to the following power stage, which supplies an impulse of stronger current, with a certain delay with respect to the first, and so on. By succeeding in establishing the working current in a spaced-out form, it can materialize in one or more jumps so that the currents selected continue to increase progressively, varying at will the shape of the rising side of the current impulse. This method reduces the wear of the electrode by at least about 50%.

11 Claims, 6 Drawing Sheets

METHOD OF REDUCING THE WEAR OF THE ELECTRODE IN MACHINE TOOLS USING ELECTRO-EROSION

FIELD OF THE INVENTION

This invention concerns a method for reducing the wear of the electrode in machine tools using electro-erosion.

BACKGROUND OF THE INVENTION

Before explaining the object of this invention, it is considered necessary to briefly explain the process of electro-erosion, and then to present the improvements which will be expounded and which constitute the object of the invention.

It is known that the process of electro-erosion is carried out by making a series of electrical discharges jump between two conductors, one of them called an electrode and the other a part or workpiece.

The purpose of the is the faithful reproduction of the shape of the first on the second. It is widely used for making molds, dies, wire-drawers, etc.

To carry out the erosion, both electrodes are connected to a source of current impulses (also referred to as current pulses), generally of rectangular shape, and both being submerged in a dielectric liquid. This liquid performs various functions: it acts as insulator, as refrigerant, and for carrying away particles detached during the work.

The process of electro-erosion is brought about first and foremost by the heat effect of the electrical discharge, although there are also mechanical and electromagnetic effects.

At the initial moment, an impulse of tension (i.e. voltage or potential) is applied to both electrodes, and if the electrodes are separated by a distance sufficiently small for the impulse of tension to overcome the dielectric resistance of the liquid, this ionizes, creating a small channel through which an electrical current of a determined value circulates. This impulse will produce a localized fusion on the part to be machined, leaving a small crater in it. Each new impulse will repeat the process by which the electrode continues to reproduce itself in the part, leaving a cavity with the profile of the part.

It is necessary for the current to be pulsating so that each time a new channel opens, a new discharge passes, since if this were not the case, it would always be produced at the same point and the desired reproduction would not be achieved.

During the work, a series of residues proceeding from the fusion of the material are detached; they remain in suspension in the dielectric liquid, which should carry them away from the working zone. If they are not eliminated, these residues have a pernicious effect, since the accumulation of them makes the electrical discharges become anomalous. When this happens, some of them tend to pass by the same channel and finish by producing a continuous discharge in the form of an arc with the consequent destructive burning effect.

The process also requires the impulses to be unidirectional, since in this form it has been seen that the wear of the electrode is asymmetrical with respect to the part, the wear being less in the electrode and more in the part. The ideal would be if there were no wear at all in the electrode. Unfortunately, this is not the case in practice, and this is due to various factors.

The main objective of this invention, apart from other improvements, is to reduce the wear of the electrode practically to about half of the wear which now takes place in electro-erosion machines.

It is known that electro-erosion made a great advance in respect of wear and speed of mechanization when, instead of using systems based on relaxation circuits, the system of pre-established impulses of current was introduced.

The use of impulses made a great advance thanks to modern power transistors which make it possible to control very high current intensities and which, in addition, can work at considerable commutation speeds, making it possible to use sufficiently high frequencies.

One of the most suitable forms of making a transistor work to control strong currents is by using the so-called commutation or switching system or in which the transistor presents two clearly defined states: the off state and the state of saturation. This system has the advantage of high performance and little dissipation of heat in the commuting (switching) element, since tension and current do not coincide in this element at the same time.

The greatest losses in such a system are produced more or less exclusively at the moment of transition from one state to the other, so the attempt should be made to produce this transition in the shortest possible time. The shorter it is, the better the transistor will work and the smaller will be the losses in it, although naturally the type of load coupled to it also influences its working. That is, smaller load currents will naturally permit longer transition times without excessive losses, and heavier load currents will require shorter transition times.

For a better explanation of the phenomenon, see FIG. 1 which shows an impulse of current and in which we can see that the shorter are the "t" on and the "t" off times, the less will be the dissipation in the transistor, i.e. what is claimed is that both sides will be as vertical as possible, with the greatest attainable value of di/dt.

Returning to the process, we see that in FIG. 2, an impulse of tension in open circuit is represented at (a), and an impulse of tension in working conditions at (b) and (c). Represented at (d) and (e) is the impulse of current corresponding to each of the above.

In an open circuit, i.e. when the electrode and the part are separated by a distance greater than that necessary for ionization, the impulse has the shape represented at (a). This impulse has had no effect, so that it is a lost impulse. In (b), the impulse of tension already represents a distinct shape since in this case both electrodes will be at the correct distance, and therefore the ionization will have been produced. The time t, on is the time of ionization after which the impulse of current would have circulated between both electrodes. At (c) we see another impulse of tension which presents a longer time of ionization than the previous one.

This delay in the ionization is completely random, although by increasing the tension in the casting mold (i.e. increasing the voltage between the electrode and workpiece) it is possible to reduce this time considerably. If the ionization time is lengthened, we see that the impulse of current is narrower and circulates for a shorter time.

Since, in addition, the energy of the impulse is proportional to its area, the material torn out and thus the crater left will be different in both cases.

In practice, there are two fundamental systems: the isoenergetic impulses and the heteroenergetic impulses. The former have an equal time of duration, while the latter have completely irregular times.

Between two consecutive impulses of current, there must always be a pause, the purpose of which is to allow the dielectric liquid to recover its insulating properties so that it can close the channel of conduction in the mold, and in this way make it possible to reinitiate the process at another different point of the part.

In practice, we try to make the pause as short as possible so that the frequency of recurrence can be as high as possible, in order to increase the productivity of the removal of material. However, either because there are residues in the gap between electrode and part, or because hot points are produced, if the pause is excesively short, there are times when various consecutive impulses travel through the same channel, with the result that there is no de-ionization and the process degenerates into a continuous electrical arc, damaging the part and the electrode and forming a carbon which could have fatal consequences and which must be eliminated by the worker himself.

One of the procedures used to avoid this phenomenon is to give a periodical reciprocal movement to the electrode, so that when the electrode moves away, it is easier to evacuate the residues. However, since the accumulation or residues depends on various factors such as the speed of working, the geometry of the part, the depth of the cavity, etc., it is practically impossible to optimize the cleaning cycles so as to avoid the problem completely, unless this is done at the price of poor performance by the machine.

It is possible to detect the instant at which these abnormal discharges are going to be produced is by observing the peak tension of ionization, since before the degenerative phenomenon is produced, it is possible to observe that these peak tensions diminish or even arrive at total cancellation, so this makes it possible to take pertinent measures to attack the problem before it worsens.

The system of temporary withdrawal of the electrode also has another disadvantage in that it is totally independent of the conditions of work. Frequently the electrode withdraws when it is needed, and fails to withdraw when it is not needed. Giving this alternating movement to the electrode brings about a spectacular reduction in the performance of the machine, since during these withdrawal and advance intervals, the machine does not erode. So if we add up these fractions of time lost at the end of a working day, the total ineffective time can be considerable, with a corresponding considerable loss of productivity.

In all electro-erosion machines, the pause times are controlled totally independent of the control of the impulse times, so that at each new regulation of the impulse time, it is necessary to regulate the pause time to obtain good stability and performance in each new regime selected.

This will become clearer if we take an example. Supposing that we have selected as a first work pass an impulse time of 100 microseconds and a pause time of 10 microseconds. Once the work at this speed is finished, we want to change to an impulse time of 10 microseconds. If we do not modify the pause, we shall see that, while in the first case we had an impulse to pause ratio of 10 to 1, in the second case we would have a ratio of 1 to 1, i.e. of 50%, with which the performance (efficiency) obviously cannot be the same.

In the circuit developed in this invention, the ratio is maintained constant, since the pause time is always expressed as a percentage of the impulse time selected.

Let us now go on to analyse the wear suffered by the electrode. In this respect, the inventor has been able to find that almost 50% of the wear suffered by the electrode takes place at the moment of establishing the channel of ionization (i.e. increasing the voltage between the electrode and workpiece), and the shorter the time of transition between break- and conduction, the greater is the wear produced. This led him to frame the hypothesis that at the moment of initiating the discharge, the channel is infinitely small, and if a very high current circulates in it, the resulting density of current is very high. With the passage of time, the channel progressively widens, thus distributing the same current over a greater area, so that the density of the current logically diminishes. However that may be, one thing is certain: the more vertical the slope of the rising side of the current impulse, the greater the wear, i.e. the wear is in a certain manner proportional to the ratio di/dt.

Moreover, the initial peak of current can be reinforced by the fact that, due to the parasite capacities present in the circuit and capacity proper to electrode and part, if these capacities are loaded before the ionization, they discharge their energy at the moment the ionization is produced, with an initial energy at $\frac{1}{2} Cy^2$.

Since this necessary reduction of slope in order to avoid wear is incompatible with good commutation of the power transistors, since its dissipation could go outside the safety area, a method has been established which complies with both requirements.

So a method has been invented which does not present these disadvantages and, in addition, makes it possible to give time to the channel to widen progressively.

The method consists in giving the generator of impulses various stages of power, distributed in weighted form in respect of the intensities of current referred to, of which the first could be supplied at the same tension as the others, or at a higher tension than the others, with which the initial ionization could be facilitated.

The different stages of current are disposed in such a way that the discharge of each of them is produced sequentially and preferably regulated by a code determined to be able to produce the whole range of necessary values of current, with a minimum number of them, such as, for example, the BCD code.

The interval of time between each discharge of the stages is, in the same way, variable at will, so as to be able to produce the desired delay between each one of them.

The first step of power supplies an impulse of current the value of which should be equal to or slightly more than the minimum intensity of current needed for maintenance of the discharge, and always less than the working current selected. It should be noted in passing that the maintenance current is the minimum value of intensity, below which the discharge of each impulse is made unstable and its establishment unpredictable.

In the system developed, once the ionization is initiated, a circuit detects that this is the case and sets off a programmable counter which begins to count impulses proceeding from the time base, the frequency of which is much higher than those of the working impulses, and once the preselected count has been reached, the circuit gives a signal of conduction to (switching on) the following stage of power, which supplies an impulse of current stronger than the previous one, with a certain delay in respect of the first. The third stage will be connected at the end of a certain time after the second has been connected, and so on.

In this way, we make it possible for the preselected current not to be established instantaneously at the moment of ionization, but in a spaced-out form, thus giving sufficient time to the channel to widen to a sufficient degree to let the strong impulse pass.

We can see that this spacing out can be made in various jumps or steps so that the selected currents increase progressively until they arrive at the desired peak value, and from that moment onwards, the impulse continues normally in rectangular form (FIG. 10).

So what is invented is the power to vary the slope of the rising side (leading edge) of the current impulse step by step, the breadth of each step being a function of the time and the height, and since a function of the current varies each one of these parameters, it is possible to achieve an infinite range of shapes of the rising side of the impulse of working current, thereby giving it the form most suitable for reducing the wear of the electrode to its minimum value. FIG. 10 shows different forms of the rising side of the impulse.

It has been found with this method that the wear of the electrode diminishes by practically 50%. This is of importance, mainly in production involving fine relief work in which the cost of the electrode can represent an important item. Moreover, with this method, the small amount of wear is much more uniform and regular than with the known method, since it is precisely on sharp edges that the greatest wear is produced.

With this method, the transistors can always work with perfect commutation (switching) permitting unlimited adjustment in the breadth and height of the step in question.

As the initial intensity is relatively weak, and therefore it is not practical to carry out an infinitesimal stepping, this first stage of supply can be equipped with means for varying the slope of the rising side of the current. For example, the slope of the vertical leading edge of the first stage current pulse can be varied as shown by the broken line in FIG. 10. Taking especial account of the fact that in spite of what has been said about the dissipation of power, and given that in this first stage the current the is low, it would not therefore present problems of heat dissipation.

It is obvious that if 50% of the wear of the electrode takes place in the rising side of the current impulse, the wear will be in direct relation to the number of impulses or to the frequency, and this is confirmed in practice, since the wear is greater in the higher frequency regimes, which are precisely those used for finishing work, i.e. precisely those in which the wear is most inopportune.

The method can be applied to any system for producing impulses, whether or not the impulses are isoenergetic; if they are not, however, there could be a considerable loss of performance in the machine, since if the time of ionization is considerably prolonged (see FIG. 2(c)), the strong current impulse could fall outside the period of duration of the ionization voltage impulse, i.e. during the pause, which would mean that these impulses would irremediably lost and therefore would contribute very little to the useful work.

In the same way, the stepping can be produced in the falling side of the current impulse, which would make it possible to obtain an additional reduction of the wear, albeit a less significant one, since in consequence a small inversion of the current takes place, which may be produced when the instantaneous impulse of strong intensity is cut, there being—as there always are—parasite inductances in the circuit.

DETAILED DESCRIPTION

For greater clarity, we explain one of the possible practical implementations of the system.

Figure 1:
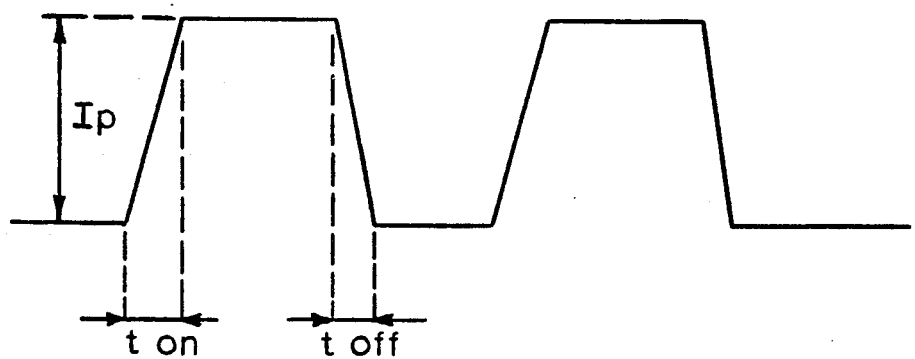
FIG. 1 is a diagram showing current impulses.
Figure 2:
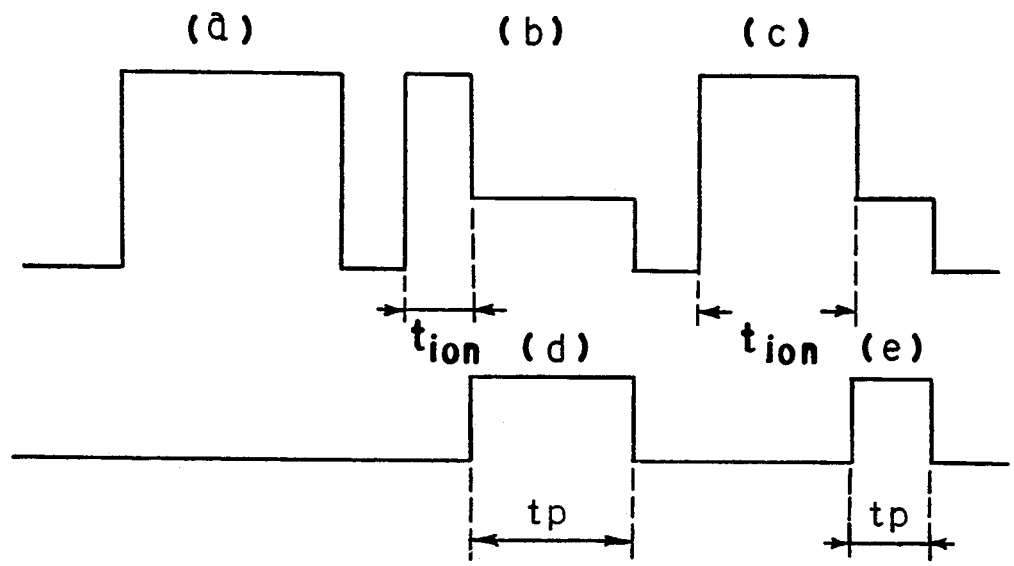
FIG. 2 is a diagrammatic showing of voltage and current impulses.
Figure 3:
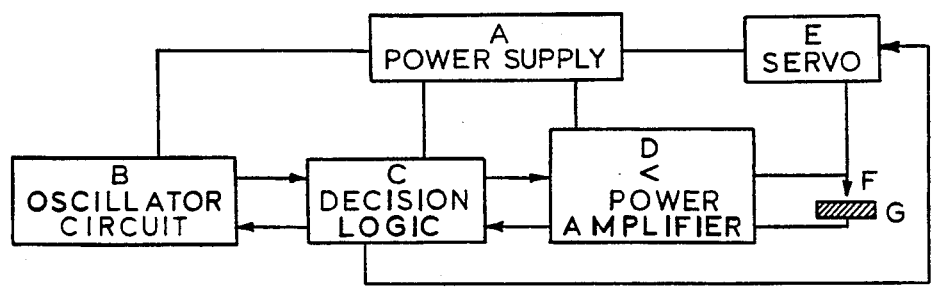
FIG. 3 is a block diagram of the inventive method.

In FIG. 3 can be seen a block diagram in which A represents the general source of supply, B an oscillator circuit, C a decision logic, D the power amplifier, E the servo activating the electrode, F the electrode and G the part to be worked.

Let us now look at the working of each of them, block by block. Starting with block A; this consists of a series of supply tensions (voltages) with their transformers, rectifiers and filters, well known to technicians in this field, so that we need not here go into more detail on them.

Figure 4:
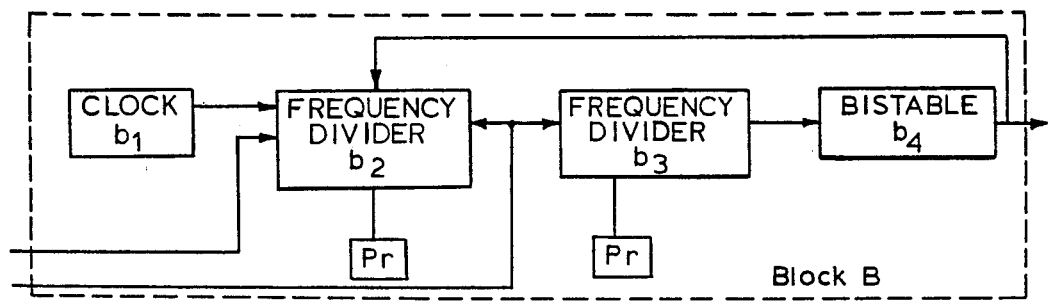
FIG. 4 illustrates the components within the block B of FIG. 3.

Block B is shown in FIG. 4, and in it we see that $b_1$ represents a clock generating impulses with a frequency much higher than that of the working impulses of the machine. It will preferably be a quartz crystal clock, so as to guarantee good precision and stability. We will suppose that this clock works at a frequency of 100 MHz.

The impulses proceeding from the clock enter block $b_2$ which is a frequency divider composed of a fixed division unit of value 100 and a unit that can, be programmed from outside by means of the preselectors Pr, or via a computer. This divider constitutes the generator of pause times. The impulses leaving block $b_2$ pass to block $b_3$, consisting of another programmable frequency divider, and this is the one which generates the impulse times of the working current. The output from this block is applied to a bistable circuit ($b_4$) which changes state with each impulse that reaches it. Its output arrives at block $b_2$ in such a way that in each of its states it selects alternately the fixed counter or the programmable counter.

Figure 5:
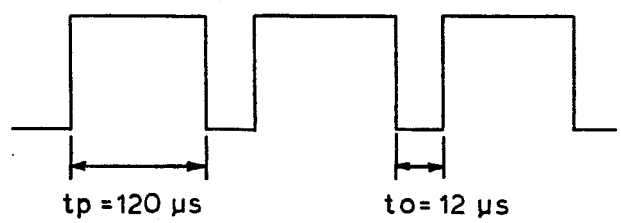
FIG. 5 is a diagrammatic showing of the output signal.

Let us suppose that an impulse time of 120 microseconds has been selected, and a pause time of 10% of the impulse time. Starting with a frequency of 100 Mhz, whose period is 0.01 microseconds, we enter a signal of these characteristics at the divider $b_2$. If the signal proceeding from the bistable is a 1, in that case a fixed counter of value 100, for example will be selected, and the output of this divider will therefore be a signal whose period will equal $0.1 \times 100 = 1$ microsecond. This signal, applied in turn at the divider $b_3$, which is programmed, let us suppose, at 120 microseconds, will give an output of $120 \times 1 = 120$ microseconds which, when it arrives at the bistable, will cause it to change state to give an output equal to 0 with which the divider $b_2$, which was dividing by a fixed value of 100, will now divide by the programmed value which could, for example, be 10, which would give us $0.01 \times 10 = 0.1$ microseconds at the input of divider $b_3$ which is still programmed at 120. So at the output of this divider, we will now have a signal of $0.1 \times 120 = 12$ microseconds (10% of the 120 microsecond pulse time), which is what we wished. This signal will again commute or switch the bistable $b_4$, which will return to its state 1. The output signal now obtained will be as that of FIG. 5.

In the divider $b_2$, it has also been foreseen that, by means of an external signal, it is possible to vary the factor of division for the purpose of widening the pause time when the working conditions are anomalous, and in this way we can avoid the formation of arcs between electrode and part.

This can either be a single signal giving a fixed and preestablished pause width, or the pause width can preferably be variable so that if the problem has not been solved with the first pause width, the following anomalous impulse produced will increase the factor of division by a certain value, and so on at each new anomalous impulse.

This progressive widening of the pause is in itself capable of preventing the formation of arcs, but in this circuit we have also provided an interrelation between the width and the control system of the servo, so that when the pause width is produced, as the average electrode/part tension (gap voltage) diminishes progressively, this reduction is picked up by the comparator of the servo control circuit which "sees" a reduced tension and "gives" the order to open up the gap between electrode and part progressively, and proportionally to the reduction of the electrode-part tension.

If the widening continues, a second comparator, which is adjusted at a higher level, gives the order to withdraw the electrode rapidly for cleaning the gap between electrode and part. If for any reason this rapid withdrawal does not take place, it also emits a signal which inhibits the production of impulses of strong current, so that it is practically impossible for an arc to be produced.

Both divider $b_3$ and $b_2$ are also provided with an asynchronous input by which it is possible to reload the counters at any moment, reinitiating the count from that moment onwards, and in this way it is possible to obtain an impulse time the length of which is perfectly controlled.

This signal arrives at the counters from the moment at which the detector circuit, which will be described below, has detected that the ionization has been produced.

Figure 6:
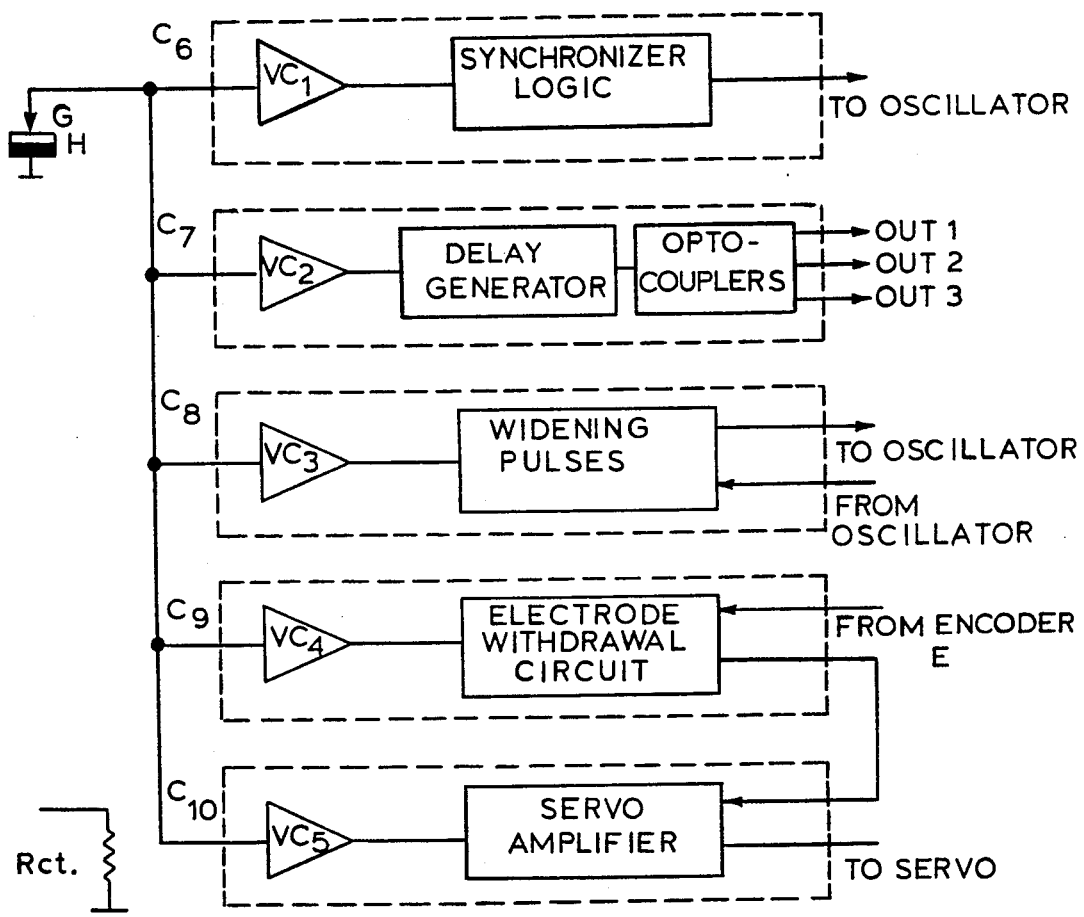
FIG. 6 is a diagrammatic illustration of the block C of FIG. 3.

We now go on to describe the discriminator block C for working conditions, shown in FIG. 6. In this we see that $VC_1$, $VC_2$ and VC are dynamic comparators of the level of ionization ion. Each of them is adjusted at the suitable detection or threshold value. Their detection is made impulse by impulse, so as to obtain a total realtime monitoring of the working conditions.

The comparators $VC_4$ and $VC_5$ measure the average working tension, or they can also be accumulators recording the number of anomalous impulses as a function of the time, or also digital comparators which record the correct impulses that should be produced and compare them with those that actually are produced.

All the comparators have an adjustable threshold level which, in the case of $VC_5$ can have an outside control for making the adjustment manually if desired.

Figure 7:
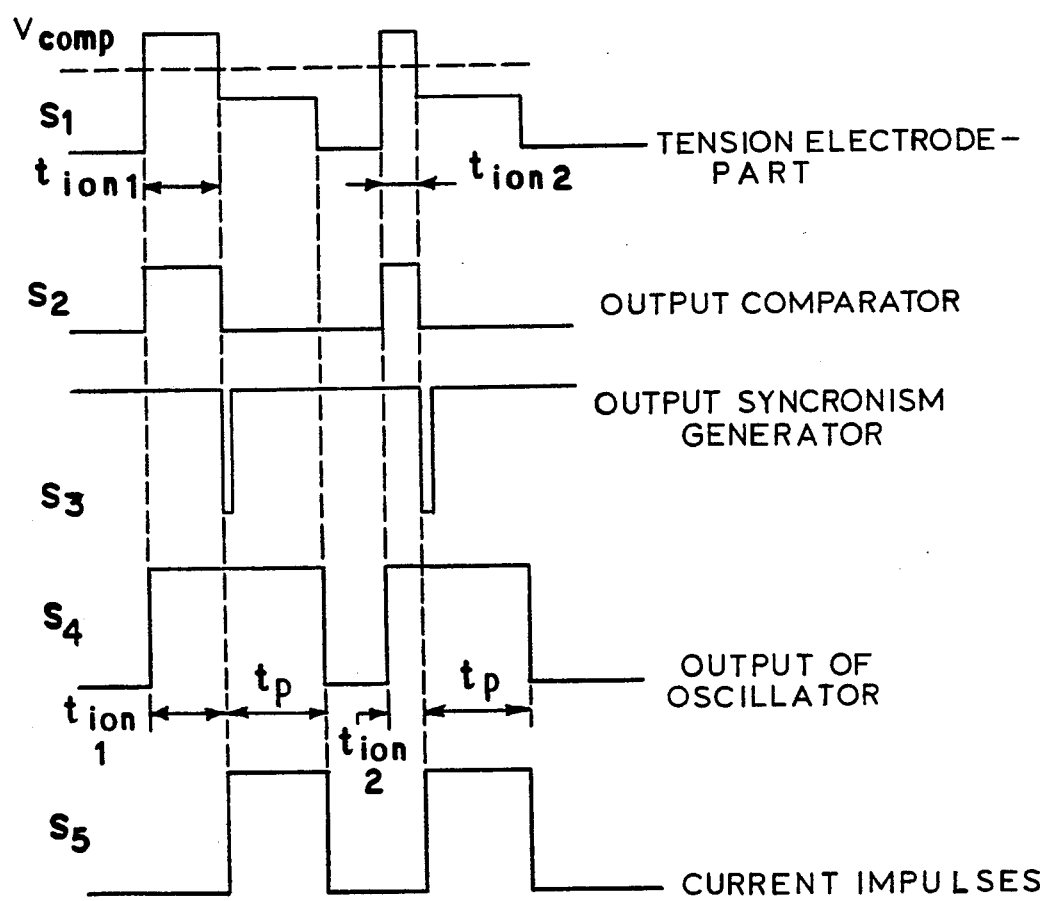
FIG. 7 illustrates several time diagrams according to the invention.

In the block $C_6$ is included the comparator of tension $VC_1$ and a logic circuit which converts the level of tension compared into a synchronization signal which is applied to the frequency dividers $b_2$ and $b_3$ of the oscillator block, which re-initiates the count of impulse time from the instant in which ionization is produced, according to the time diagrams of FIG. 7, in which diagram $S_1$ represents the electrode-part tension, and in it we can see the different times of ionization "t" ion 1 and "t" ion 2.

V comp. represents the level of comparison of the comparator VC1.

At the output of comparator VC1, the appears only during the time of ionization of diagram $S_1$, and it represents the tension which has been able to cross the threshold of the level of comparation V comp.

From the signal $S_2$ is extracted the information useful at the beginning of the ionization, which is converted into a signal ($S_3$) suitable for modifying the frequency dividers of the oscillator in such a way that the counters of the divider chains $b_2$ and $b_3$ re-initiate their count at the instant of receiving this signal, obtaining a result in accordance with diagram $S_4$. The duration of each impulse of $S_4$ is equal to the sum of the delay in ionization and the time of the working impulse. As can be seen, with this system, we have succeeded in giving the impulses of working current an equal breadth, independently of the delay associated with producing ionization, and they are equal to the programmed value tp. See diagram $S_5$.

The delay circuit (block $C_7$) includes the comparator $VC_2$, a logic circuit, and some output stages, preferably optocoupled, which are directly attached to the power stages.

The comparator of this circuit detects, like the $VC_1$, the level of ionization tension, and its output is applied to a delay generator circuit, to which is also applied the output of the general oscillator. With both inputs, and via some bistables and a frequency divider chain, some outputs are generated, out of phase with one another, according to the time diagram of FIG. 8 in which, for greater clarity, we show only two outputs which is the minimum necessary for the system to work.

These diagrams show two inputs $E_1$ and $E_2$ which correspond respectively to the signal of the oscillator and to the voltage across the gap. The signal $S_6$ is the output of the comparator and corresponds to the ionization delay. The signals $S_8$ and $S_9$ correspond to the output of the bistables, and $S_{11}$ is the output signal of the frequency divider.

The output $S_7$ is a faithful reproduction of the signal of the oscillator which, preferably via an optocoupler as we said above, is input into the stage generating the impulse of weak current for ionization.

The output $S_{10}$ is delayed relative to $S_7$ which is the sum of the programmed delay plus the time of ionizatation. This output, via another optocoupler, is input into the following stage of strong current. This means that the signal $S_7$, amplified in the stage of weak intensity power, initiates the discharge with an ionization time "t" ion 1 according to the signal $E_2$.

Figure 8:
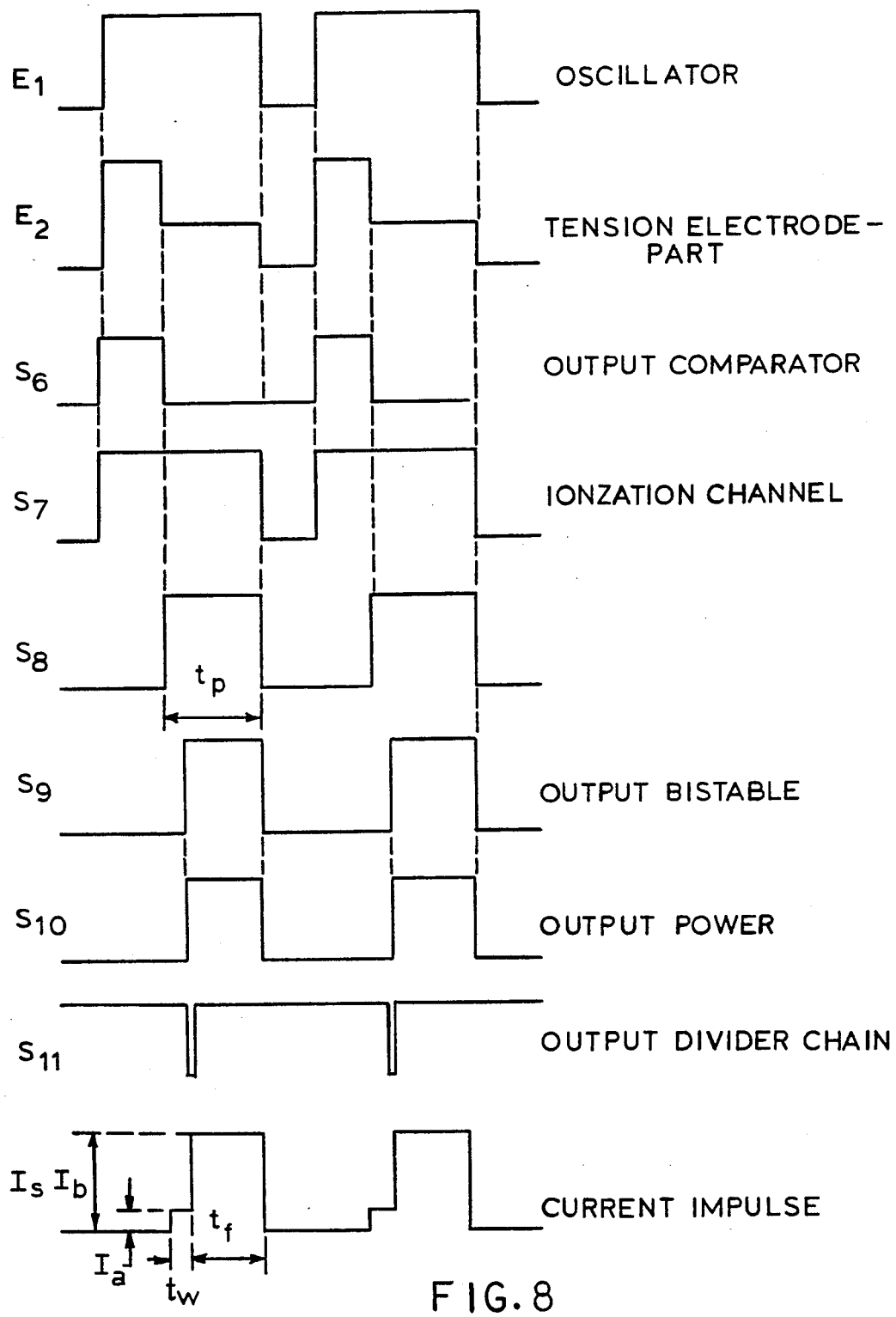
FIG. 8 illustrates additional time diagrams according to the invention.

At the instant ionization occurs the step of current of value Ia shown in FIG. 8, graph Is, is initiated in the same way, starting the count to produce the desired delay in the frequency divider chain included in this block.

When this time has passed, this divider chain emits a signal $S_{11}$ to one of the bistables of the circuit which, on changing state, generates a signal $S_9$, and the optocouplers mentioned above give the signal $S_{10}$ to the amplification stages of strong current of value $I_b$ of the graph of $I_a$ (FIG. 8).

The result obtained is that the total duration of the current impulse is $tp=t_w+t_f$, i.e. weak current during the time initiated by the channel, and strong current during the time Tf, which is the rest of the working impulse.

With this circuit configuration, by simply cancelling the signal $S_{10}$ by means of appropriate logic, we inhibit the impulses of strong current, leaving only those of weak current which, moreover, are produced with a pause of greater than normal width, so that they are continuously exploring the state of the gap.

While the anomaly persists, there will be broad pauses and—arriving at the extreme case—there will be no impulses of strong current, thus avoiding the formation of arcs. When the gap returns to normal conditions, the machining impulses of strong current will be reestablished by removing the inhibition of the signal $S_{10}$.

The practical effect this produces is reflected in the signal $I_s$ (FIG. 8) in which we observe that the impulse of current is stepped in the rising side. The small stepping corresponds to the initial impulse, and the large stepping to the power impulse.

The pause widening system block $C_8$ includes the comparator $VC_3$ and a decision logic.

The comparator analyses the level of ionization tension of each impulse signal $S_{13}$, generating an output signal $S_{14}$ in cases where it is higher than the threshold level of the comparator.

To the logic circuit, we input the signal from the comparator, and its output is applied to the divider $B_2$ of the oscillator block, supplying it with the value of the factor of division, which will be $t_o$ if it is taken from the pause preselector, or $t_e$, with a value greater than $t_o$, which will produce a longer pause. The decision between one or the other will depend on the comparator, according to the threshold level VC.

Figure 9:
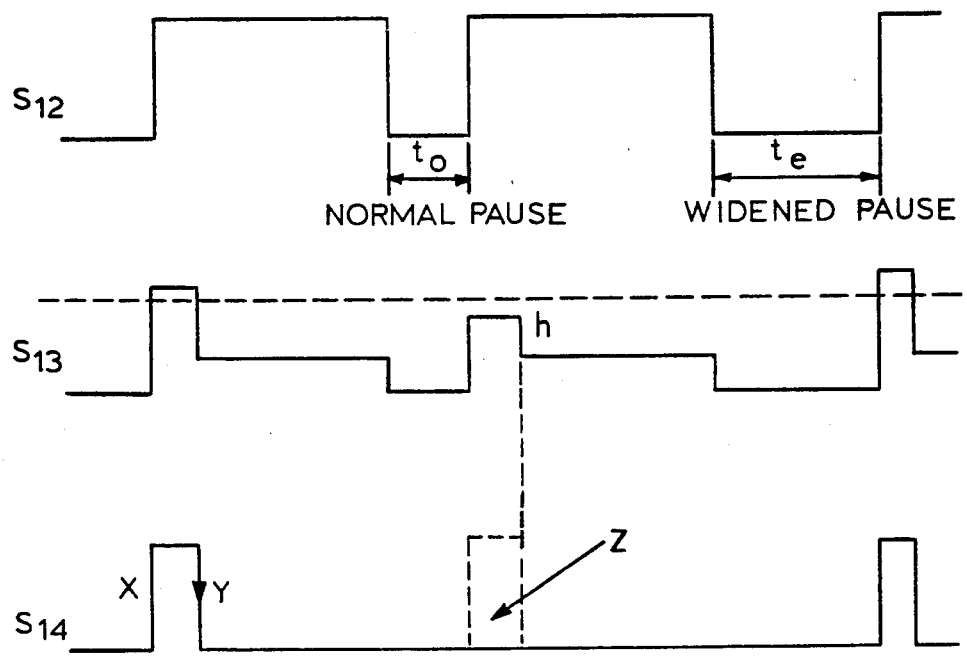
FIG. 9 is a diagrammatic showing of the impulses.
Figure 10:
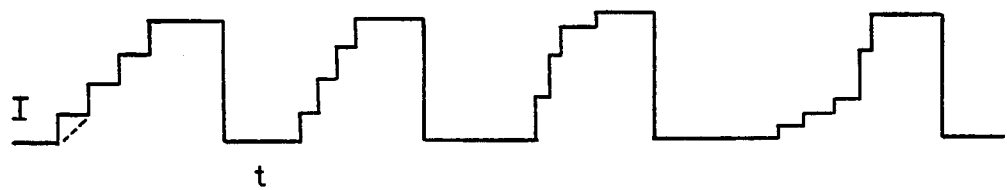
FIG. 10 is a further time diagram.

The logic circuit acts as follows: a bistable goes into one of its two states at the beginning of each impulse arriving at it from the oscillator (X), and changes state with the descending side of each impulse of ionization via the comparator (Y). See FIG. 9.

If an anomalous impulse is produced ("h" in the graph $S_{13}$) the bistable remains during the whole of the cycle in the first state. The impulse Z which should have appeared if the impulse had been normal, fails to appear, and the pause is prolonged in consequence. This signal from the output of the bistable is the signal that decides between $t_o$ and $t_e$.

Therefore the circuit continues to suppose that the following impulse is going to be anomalous, and consequently programs a longer pause, but as soon as the ionization side characteristic of normal impulses appears, the circuit switches over and programmes a normal pause, doing so while the current impulse is taking place.

The circuit $C_9$ is the one responsible for producing the signal for the withdrawal of the electrode by the servo, and consists of a medium tension comparator $VC_4$ and of a logic circuit by means of which a signal is sent for interrupting the work impulses and thus leaving the electrode and the part without tension; at the same time, another signal is sent to counters for them to record the impulses emitted by an encoder coupled to the servo, such as an encoder which emits impulses as a function of the distance traveled by the electrode. When the counters arrive at a predetermined number, the servo signal is inverted, and the servo causes the electrode to approach the part, at the same time as the counters begin to deduct. All these operations are carried out at high servo velocity, in both withdrawal and approach, but when the counters reach a certain value in their deduction, they emit a signal which orders the servo to change to its slow speed. This allows the operation of cleaning to be completed as quickly as possible and also avoids the electrode, in its new approach to the part, going too far and impacting against the part by the inertia effect of the system.

The circuit $C_{10}$ is a servo regulation circuit and consists of a tension comparator and a differential amplifier which supplies an output of $\pm 10$ V capable of controlling a servo-valve, if the servo is of the hydraulic type, or a speed regulator with four quadrants if the servo is of the electro-mechanical type, with a DC motor, or a tension-frequency converter if the motor is of the step by step type.

Block D is a power amplifier composed of transistors working in commutation, in which it is possible to use both bipolar transistors and MOSFETS, although the latter are preferable in view of their characteristics of high commutation speed, low control power, absence of second break, etc., these advantages being already known in the state of the art.

The invention, in its essentials, can be put into practice in forms other than those shown in detail in the description, to which the protection of the patent would also extend. Thus, the invention can be implemented by the most suitable means, while still being included in the spirit of the claims.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for reducing electrode wear in an electro-erosion apparatus which produces an electric current discharge across a gap defined between an electrode and a workpiece, comprising the steps of:
   providing a plurality of selectively actuable electric current supply elements for delivering respectively predetermined amounts of electric current for discharge across said gap;
   gradually changing the current discharged across said gap by incremental steps, including selectively actuating said electric current supply elements in a desired sequence beginning with a first said electric current supply element to produce a series of electric current pulses which correspond respectively to said electric current supply elements and which each have a pulse edge which defines a respective incremental change in the electric current discharged across said gap, and controlling said actuation of said first electric current supply element such that the pulse edge associated therewith has a sloping, non-vertical configuration and said incremental current change as defined by said pulse edge is progressive over time and is completed only after a predetermined period of time has elapsed.

2. The method according to claim 1, wherein said step of actuating said current supply elements includes the step of simultaneously actuating a plurality of said current supply elements at a common point in time.

3. The method according to claim 1, wherein said step of changing said discharge current includes the steps of increasing said discharge current and decreasing said discharge current.

4. The method according to claim 1, wherein said actuating step includes the steps of actuating a one said current supply element having a first amount of current associated therewith, thereafter maintaining said one current supply element in an actuated state and simultaneously actuating another said current supply element having associated therewith a second amount of current which is larger than said first amount of current, and thereafter deactuating said one current supply element.

5. The method according to claim 1, wherein said electric current supply elements include circuit means for accumulating electrical energy.

6. The method according to claim 1, including the steps of monitoring ionization conditions in said gap, producing an asynchronous signal when a predetermined ionization condition is detected, executing said discharge current changing step in response to the occurrence of said asynchronous signal, removing all discharge current from said gap after a predetermined amount of time has elapsed since the occurrence of said asynchronous signal, producing a further asynchronous signal in response to the next detection of said predetermined ionization conditions in said gap, executing said discharge current changing step in response to said further asynchronous signal, and removing all discharge current from said gap after said predetermined amount of time has elapsed since the occurrence of said further asynchronous signal.

7. The method according to claim 1, wherein said discharge current changing step includes a final step of removing all discharge current from said gap, wherein said discharge current changing step is performed repeatedly, and wherein the following step is executed between each repetition thereof;
  delaying the next successive execution of said discharge current changing step for a pause time having a length which bears a predetermined ratio to the time required for a single execution of said discharge current changing step.

8. The method according to claim 1, wherein said current supply elements are arranged in at least one of a series relationship and a parallel relationship relative to said gap between said electrode and said workpiece.

9. The method according to claim 1, including the steps of detecting a voltage differential between said electrode and said workpiece, comparing said detected voltage differential with a predetermined expected voltage value, and producing a signal when said expected voltage exceeds said detected voltage by more than a predetermined amount.

10. A method for reducing electrode wear in an electro-erosion apparatus which produces an electric current discharge across a gap defined between an electrode and a workpiece, comprising the steps of:
  providing a plurality of selectively actuable electric current supply elements for delivering respectively predetermined amounts of electric current for discharge across said gap; and
  gradually changing the current discharged across said gap by incremental steps, including selectively actuating said electric current supply elements in a desired sequence to produce a series of electric current pulses which correspond respectively to said electric current supply elements and which each have a pulse edge which defines a respective incremental change in the electric current discharged across said gap, and controlling said actuation of at least one of said electric current supply elements such that the pulse edge associated therewith has a sloping, non-vertical configuration and said incremental current change as defined by said pulse edge is progressive over time and is completed only after a predetermined period of time has elapsed, said actuating step including the step of actuating said electric current supply elements to incrementally increase the amount of electric current discharged across aid gap from zero to a desired current value, said at least one electric current supply element having said sloping, non-vertical pulse edge associated therewith being the first of said supply elements to be actuated during said actuating step.

11. A method for reducing electrode wear in an electro-erosion apparatus which produces an electric current discharge across a gap defined between an electrode and a workpiece, comprising the steps of:
  providing a plurality of selectively actuable electric current supply elements for delivering respectively predetermined amounts of electric current for discharge across said gap;
  gradually changing the current discharged across said gap by incremental steps, including selectively actuating said electric current supply elements in a desired sequence to produce a series of electric current pulses which correspond respectively to said electric current supply elements and which each have a pulse edge which defines a respective incremental change in the electric current discharged across said gap, and controlling said actuation of one of said electric current supply elements such that the pulse edge associated therewith has a sloping, non-vertical configuration and said incremental current change as defined by said pulse edge is progressive over time and is completed only after a predetermined period of time has elapsed.

* * * * *

UNITED STATES PATENT AND TRADEMARK OFFICE
CERTIFICATE OF CORRECTION

PATENT NO. : 5 187 341
DATED : February 16, 1993
INVENTOR(S) : Alberto C. GRAELL It is certified that error appears in the above-identified patent and that said Letters Patent is hereby corrected as shown below:

Column 12, line 31; change "aid" to ---said---.

Signed and Sealed this

Twenty-third Day of November, 1993

Attest:

BRUCE LEHMAN

Attesting Officer

Commissioner of Patents and Trademarks